May 20, 1958  F. M. GALLOWAY  2,835,532
IRRIGATION SYSTEM AND APPARATUS THEREFOR
Filed March 1, 1955
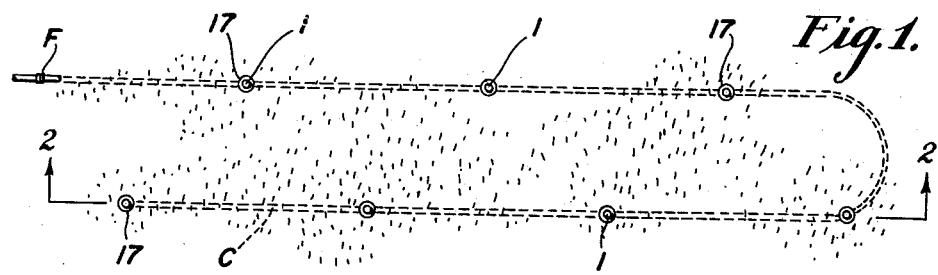
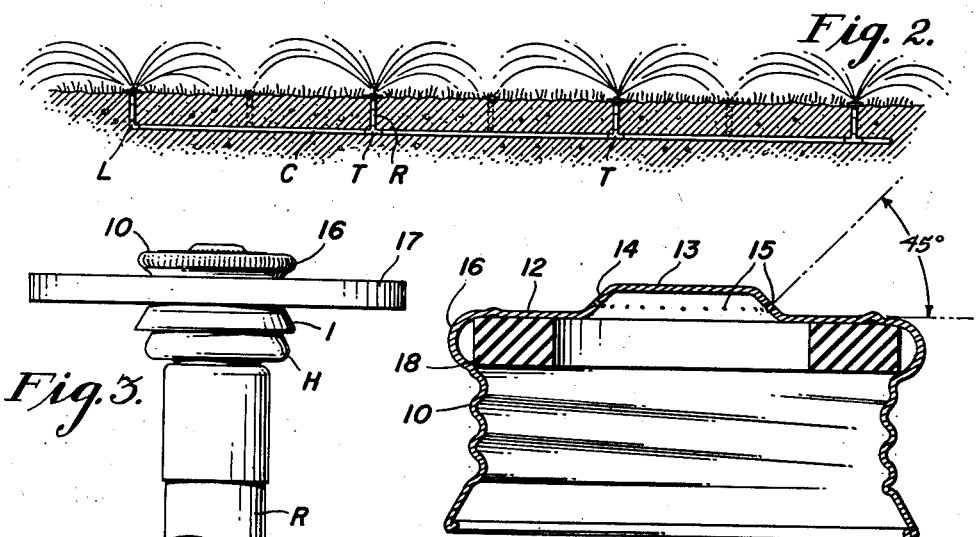
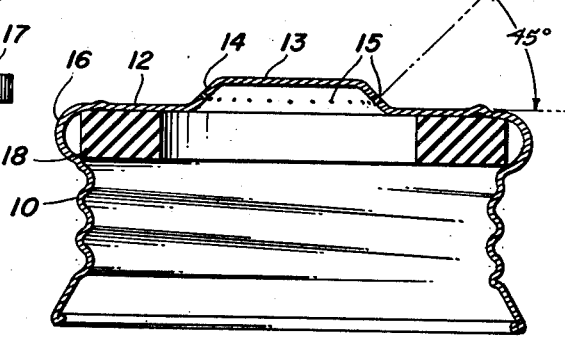
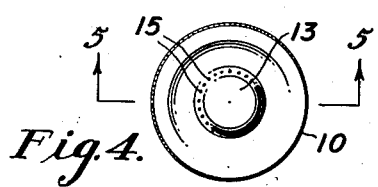
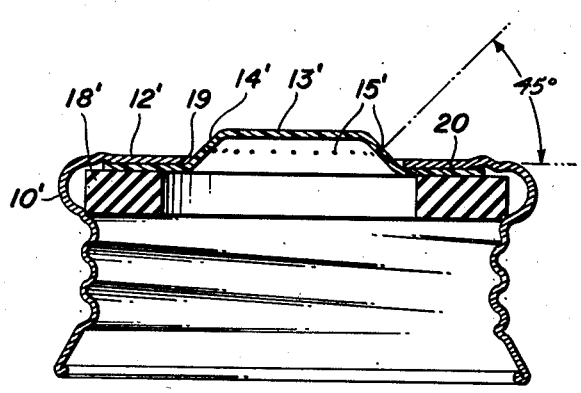
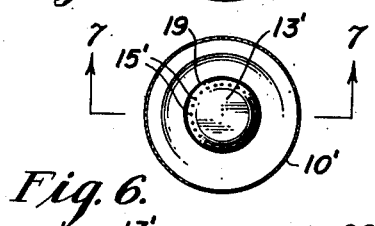
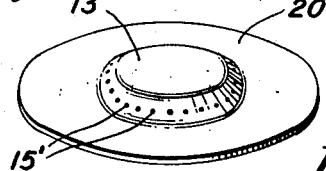
INVENTOR
FREDERICK M. GALLOWAY
BY
ATTORNEY

United States Patent Office 2,835,532
Patented May 20, 1958

2,835,532
IRRIGATION SYSTEM AND APPARATUS THEREFOR

Frederick M. Galloway, Langhorne, Pa., assignor to H. K. Porter Company (Delaware), a corporation of Delaware Application March 1, 1955, Serial No. 491,457

5 Claims. (Cl. 299—60)

The present invention is directed to an irrigation system, primarily one for lawn use to effect uniform distribution of irrigating water over a relatively large area from conduits buried beneath the lawn surface, its exposed parts being so close to that surface as not to obstruct passage of a lawn mower or the like thereover.

More particularly the invention contemplates the provision of a novel spray head for an irrigating system of such character whereby water may be distributed over the area to be irrigated in the form of a relatively fine spray or mist in quantity per unit of time adequate to effect its penetration into the soil without appreciable run-off due to inability of the soil to absorb an excess.

Many irrigation systems of this general character are now in use and considerable difficulty is experienced with them in economic utilization of available water by uniform distribution of it at the optimum rate per unit of land area, those which effect adequate distribution to portions of the area which receive the least amount of water usually also distributing uneconomically excessive quantities to adjacent areas, resulting in waste of water by run-off, and sometimes even having deleterious effects upon the lawn grasses through over-saturation of the soil, erosion and otherwise. Moreover many of the sprinkler heads heretofore available for use in systems of the character aforesaid are difficult to install in such manner as to remain operative indefinitely and yet without obstructing the passage over them of lawn care equipment and the like or becoming clogged with soil during periods when they are not in use.

Furthermore, the line pressure of water supplies available for irrigation normally varies within wide limits from one community to another as well as in any given supply, and when apparatus including such heads is connected to a domestic water system upon which others make varying demands the rate of water distribution per unit area fluctuates widely in response to relatively small variations in the pressure at the heads and the area over which each of the latter distributes its share fluctuates correspondingly.

It has been determined that for most lawns requiring irrigation the optimum distribution of water at each application is a quantity equivalent to one-half inch of depth or about 14,000 gallons per acre which, if uniformly applied at a rate not materially in excess of ¼" per hour, normally provides adequate moisture in an average lawn to a depth of 4" in two hours without appreciable run-off or excessive saturation of any part of the area; its distribution at such rate in relatively heavy or high velocity streams, however, may cause excessive erosion of the soil and/or damage to the grass plants forming the lawn, particularly if freshly seeded and it is well known that a fine spray or mist applied at about the rate indicated affords best results. However, at pressures normally available sprinkler heads heretofore used which are capable of reducing water to the minute droplets required to prevent erosion and the like distribute it in excessive quantities while those which can be controlled to deliver it at the optimum average quantity per unit of time do not distribute it uniformly as regards the area being watered and have only very limited ranges.

It is therefore among the objects of the invention to provide an improved sprinkler or spray head for an irrigation system of the character described by which at normal pressures, and within normal limits of pressure variation in the available supply, uniform distribution of water over a wide range at substantially optimum rate is effected so that use of an appropriate number of the heads permits a large area to be properly irrigated in a limited time without uneconomic distribution of excess water to any part of it.

It is a further object of the invention in one of its embodiments to provide a sprinkler or spray head comprising a replaceable plastic plate in which water distributing orifices are formed whereby in the event of clogging, breakage or other mishap to it replacement can conveniently be effected at negligible expense to restore the head as a whole to fully operative condition.

Other objects, purposes and advantages of the invention will hereinafter more fully appear or will be understood from the following description of certain embodiments of it wherein reference will be had to the accompanying drawing in which:

Fig. 1 is a diagrammatic plan view of a typical lawn irrigation system in which may be employed the novel spray heads of my invention;

Fig. 2 is a diagrammatic section on the line 2—2 in Fig. 1;

Fig. 3 is an enlarged side elevation of one of the heads as mounted on a fragmentarily indicated part of the piping system;

Fig. 4 is a top plan view of said head with the shielding disk shown thereon in Fig. 3 omitted;

Fig. 5 is a further enlarged section of the head on the line 5—5 in Fig. 4.

Fig. 6 is a top plan view corresponding to Fig. 4 but showing a different head.

Fig. 7 is an enlarged section on the line 7—7 in Fig. 6 and

Fig. 8 is a detail in perspective of the spray disk utilized in the head illustrated in Figs. 6 and 7.

Referring now more particularly to the drawing it will be understood the general distribution of spray heads 1 in Figs. 1 and 2 forms no part of my invention, nor is the disposition of conduit C in the soil with risers or feed pipes R leading therefrom as illustrated to be considered any part of or limitation upon the invention which resides in the spray heads themselves, Figs. 1 and 2 thus serving only to illustrate one manner in which they may be advantageously employed. It is preferred, however, in the installation of spray heads 1, particularly in areas where the soil is subject to freezing in winter, to utilize plastic conduits in sections of suitable length joined together by plastic T-fittings T with an elbow fitting L at the end of the system; one of the risers R, also of plastic, extends from each fitting approximately to the ground level and all are provided with ordinary externally threaded male hose couplings H for reception of the spray heads. Polyethylene plastic is suitable for the conduits, fittings and risers, while the couplings may be made of brass, although where freezing is not a problem the conduits, fittings and risers may also be made of metal if preferred. The risers R are desirably spaced about 15' apart along the conduits and arranged in staggered rows fairly uniformly over the area to be irrigated, any suitable number of them in series being supplied with water from a single source (not shown) connected to a fitting F at one end of the first conduit section. When ½" I. D. polyethylene pipes and fittings are used and each series as is preferable comprises about seven heads with water at usual pressures about 1600 sq. ft. of lawn may be irrigated at about the optimum distribution rate per unit area; with larger pipes a greater number of heads may be used at the same spacing to irrigate a correspondingly larger area. At about this spacing each head is within, but is preferably located near the edge of the maximum range of water projection from adjacent ones so some water is delivered from each of at least two of them to substantially every part of the area being watered, as indicated in Fig. 2; this insures adequate irrigation of the entire area within the outer perimeter of the series range.

Each spray head, as more particularly shown in Figs. 3–5 may in accordance with the invention comprise in general a cupped body 10 provided with internal threads complementary to and cooperative with the external threads on hose coupling H to hold the spray head in place on a riser R. Plate 12 forming the top of the body 10 is externally dished about its axis into a raised circular boss 13 surrounded by an annular sloping shoulder 14 having a concentric series of small holes 15 extending through it with their axes at approximately 45° to the axis of the body and to the plane of plate 12. These holes should be of greater length axially than in diameter and when the body 10 is formed from sheet brass or the like of a usual thickness for articles of this character, say about .025–.032", the hole diameters should be about .022". Usually a series of 24 of them uniformly spaced at 15° intervals circumferentially about the shoulder 14 provide adequate coverage and when water under normal pressures is projected from orifices of this size the jets they form disintegrate individually and coalesce in a fine spray of minute droplets or mist shortly after leaving the orifice of the holes. Restriction of the diameter of the latter in relation to their axial length as determined by the thickness of the material, affords directional control of the jets which eliminates interference or collision between adjacent ones unavoidable when the holes are of larger diameter than the thickness of the material as in prior heads of this general character which do not afford such directional control and are therefor limited as to the range to which the water is projected, resulting in it being distributed at an excessive rate per square foot of the area reached thereby.

The outer rim of the body 10 is provided with a bead 16 desirably knurled to facilitate installing it, the bead retaining on the head a resilient annular shielding disk 17 which is preferably positioned thereon approximately flush with the ground level to form a barrier against growth of grass too close to the spray orifices. These disks may be made of a green colored rubber compound so as to blend visually with the surrounding grass and thereby avoid objectionable unsightliness; they may be about 2⅞" in outer diameter, 3/16" thick and sufficiently flexible and elastic to yield rather than break when contacted for example by the wheel of a lawn mower passing over them, while a rubber gasket or hose washer 18 of standard size is usually fitted in each body before it is set up on the hose coupling H to inhibit leakage of water through the threads and also to some extent cushion the head when it is walked upon or struck by a lawn mower wheel. Since of course all parts of the head are either below the ground level or substantially flush therewith there is no possibility of interference thereby with the blades of a mower or other implement used in caring for the lawn.

In the modified embodiment of the invention illustrated in Figs. 6, 7 and 8 the spray head body 10' is in many respects similar to the body 10 but instead of boss 13 in its end plate 12' it is provided with a circular axial hole 19 and holes 15' are formed instead in a plastic spray disk 20 inserted in the body and provided with a central boss 13' which extends through the hole 19 when the disk is in place, holes 15' in the shoulder 14' of the disk corresponding in size and arrangement to the holes 15 in the head previously described. An advantage of this embodiment of the invention is that when some of the holes 15' in disk 20 are omitted or plugged as when it is desired to spray water in an arc of less than 360° about the head if positioned close to a building, sidewalk, driveway or the like, or in a corner of a lawn, the segment in which the holes are present and open may be directed toward the area to be watered before the body 10' is fully set up on a coupling and the body then screwed down tightly without changing the angular position of the holes, the friction of gasket 18' against the underside of the disk which is greater than that at the metal to plastic contact between the body and the disk holding the latter in proper rotative position during this operation.

If for any reason one of the disks 20 should become damaged or too seriously obstructed it may be replaced at insignificant expense as compared with replacement of the entire head, the disk 20 being normally held in place in the cap 10' only by gasket 18', which is itself usually secured therein by a snap or pressure fit.

Tests have been made to establish certain of the advantages of the present spray heads over those of the prior art most nearly comparable thereto of which I am aware, particularly those substantially identical with that shown in Figs. 3, 4 and 5 except for the presence of a ring of holes fewer in number than the holes 15 but .032" in diameter and thus equal to or larger than the thickness of the material in which they are formed.

These tests show that a system utilizing seven heads of the latter type is substantially incapable of affording satisfactory irrigating coverage at operating pressures in the supply line below 15 p. s. i. although a comparable system using my improved spray heads at 5 p. s. i. operating pressure distributes approximately 2.50 gallons of water per minute over an area substantially equal to maximum coverage and thus at the rate of .155" per hour, and 3.15 G. P. M., equivalent to .195" per hour over the same or a slightly larger area at 10 p. s. i. operating pressure. At 15 p. s. i., the lowest pressure at which the heads having .032" holes can be said to operate to some degree satisfactorily in said system, said heads distribute 7.50 G. P. M. or .465" per hour, nearly twice the optimum rate of .250" per hour deemed most satisfactory for effective water use in lawn irrigation, whereas heads constructed in accordance with the invention under that pressure distribute 3.75 G. P. M., or .233" per hour, distributing ½" of water over the given area in two hours eight minutes, almost exactly the optimum time for best penetration into the soil, while at 20 p. s. i. operating pressure only 4.35 G. P. M. are distributed, or .270" per hour as compared with the .502" per hour distributed by the prior art heads at the same pressure.

As showing this difference results not merely from a difference in the relative aggregate areas of the distributing orifices in the heads it has been calculated that in seven of my heads each having twenty-four .022" holes the aggregate orifice area is .056842 sq. in. whereas seven heads each having twelve .032" orifices provide an aggregate orifice area of .067557 sq. in., a difference of about 18.9%; at 15 p. s. i. however the prior art heads distribute just twice the volume distributed by my heads (7:50::3.75) and at 20 p. s. i. almost twice as much (8.10::4.35). This restriction on water volume distributed by my heads thus is due in part to the holes through which the water is ejected from the heads being of less diameter than their axial length which greatly facilitates distribution of the water over the maximum area and in the desired form of minute droplets or mist, inhibiting surface erosion even under excessive over-watering and substantially eliminating surface run-off and waste of valuable water resources inevitable where water is applied to the ground at a rate per unit of ground surface greater than the maximum capacity of the soil to absorb it, namely, in most soils about .250″ of water per hour.

The directional control of the individual minute jets of water projected outwardly by my spray heads also contributes substantially to this result as they radiate regularly from the head center and largely break up into mist through friction with the ambient air alone after they have diverged from adjacent ones a sufficient distance to avoid range-restricting collisions therewith, the uniform mist-like precipitation thus effected over a maximum area being at the optimum rate per unit area in relation to the capacity of average soil to receive and absorb it.

While the improved spray head embodying the invention is particularly useful in permanently installed irrigation systems comprising buried conduits and risers connected therewith supplying water to a number of them at or adjacent the ground surface, one may be used if desired on an ordinary garden hose to deliver a fine mist-like spray to a localized area without causing erosion of the soil or excessive oversaturation even when used longer than necessary for irrigating it. Having the capacity to deliver water only in the mist-like spray to which reference has been made, which is absorbed by most soils at the rate applied, my spray head may be used for irrigating garden crops, nurseries and the like to any desired depth without appreciable run-off or erosion, requiring only that proper attention be given to the time during which it is utilized for spraying a given area to insure adequate moisture reaching roots deeper than those customarily found in lawn grasses.

It will moreover be understood that while I have herein particularly shown and described certain embodiments of the invention and referred to different ways they may be used, I do not desire or intend thereby to limit or confine the invention in any way as other embodiments of it will occur to those skilled in the art and each may be employed in any manner desired without departing from the spirit and scope of the invention as defined in the appended claims.

Having thus described my invention, I claim and desire to protect by Letters Patent of the United States:

1. In an irrigation system a plurality of spray heads disposed at spaced intervals, each comprising a plate positioned parallel to and substantially in a common plane and each head being disposed with the limit of its fluid distributing range extending within that of at least one adjacent head, each plate comprising a substantially circular boss and having a series of holes defining a circle at the base of the boss, the axes of said holes extending at substantially 45° to the axis thereof and the diameter of each hole being less than its axial length.

2. Apparatus as defined in claim 1 in which the thickness of each plate is not less than .025″ and the diameter of each hole therein is less than .025″.

3. A spray head for distributing fluid under pressure comprising a substantially cylindrical metal body and an end plate coaxial therewith having a central substantially circular integral boss outwardly offset therefrom, said plate at the junction of the boss therewith having a plurality of holes defining a circle coaxial with the boss, the holes having their axes extending at approximately 45° to the axis of the head and each being of a diameter less than .025″ and of axial length not less than .025″.

4. A spray head as defined in claim 3 in which the body has a radially inwardly directed annular flange at its end and the plate boss extends through said flange from the interior of the body to beyond the opposite face of the flange.

5. A spray head as defined in claim 3 in which the body is metal and the plate is non-metallic, is disposed in substantial registry with the body flange and with its boss coaxial with a central circular aperture in the body defined by the radially inner edge of the flange.

References Cited in the file of this patent

UNITED STATES PATENTS

| | | |
|---|---|---|
| 188,628 | Heacock | Mar. 20, 1877 |
| 2,080,341 | Schumacher | May 11, 1937 |
| 2,366,969 | Kiggins | Jan. 9, 1945 |
| 2,414,723 | Davis | Jan. 21, 1947 |
| 2,446,918 | Goddard | Aug. 10, 1948 |
| 2,495,346 | Ramsdell | Jan. 24, 1950 |
| 2,567,176 | Ballard | Sept. 11, 1951 |